Jan. 19, 1926.  1,570,232
H. DYER
GAS VALVE CONTROLLED VENTILATING DEVICE
Filed Feb. 28, 1925
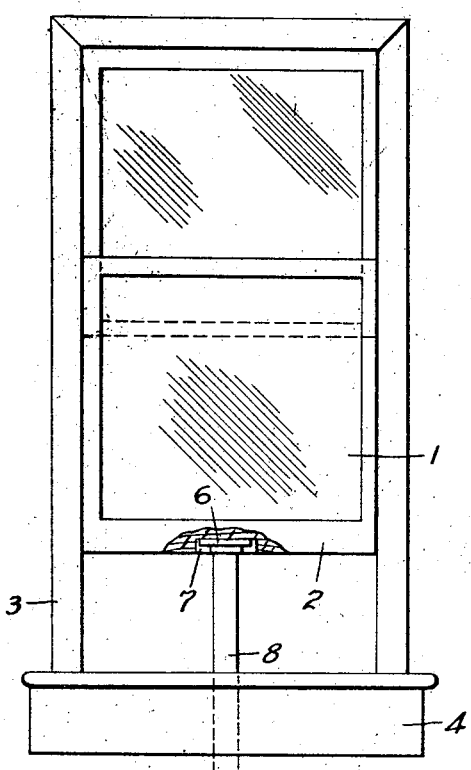
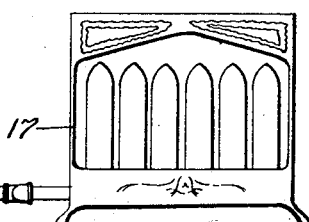
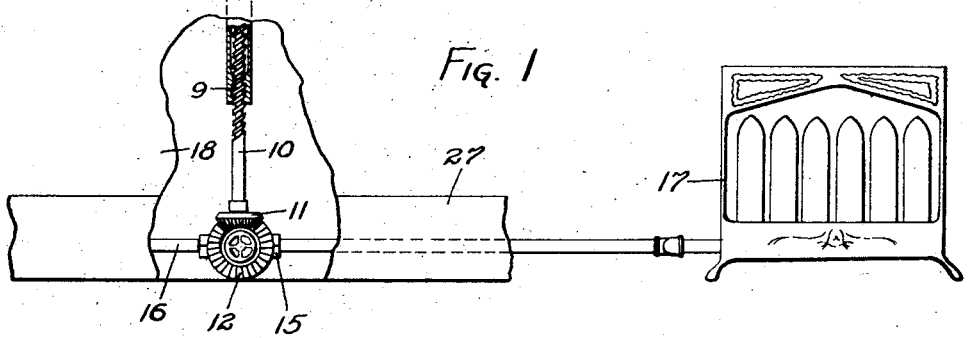
Inventor
H. Dyer
by Hazard and Miller
Attorneys.

Patented Jan. 19, 1926.

1,570,232

UNITED STATES PATENT OFFICE.

HARRY DYER, OF LOS ANGELES, CALIFORNIA.

GAS-VALVE-CONTROLLED VENTILATING DEVICE.

Application filed February 28, 1925. Serial No. 12,348.

*To all whom it may concern:*

Be it known that I, HARRY DYER, a citizen of the United States, residing at Los Angeles, in the county of Los Angeles and State of California, have invented new and useful Improvements in Gas-Valve-Controlled Ventilating Devices, of which the following is a specification.

This invention relates to ventilating devices, and particularly to a gas valve controlled ventilating device.

It is well known that injury to health, and sometimes death, occurs when a gas heater or gas light is used in an unventilated room, or when the flame is extinguished by reason of a momentary cessation of gas flow and the gas is subsequently discharged in an unburned state into the room.

It is an object of this invention to provide a device which automatically produces ventilation in a room whenever a valve controlling a gas supply is open. This is accomplished by properly correlating a device on the gas valve with a window, so that the window will be opened when the gas is turned on.

Other objects and advantages will be made manifest in the following specification of an embodiment of the invention illustrated in the accompanying drawings, in which:

Figure 1 is a front view of the gas valve controlled ventilating device shown in relation to a window and a gas heater, with parts cut away to show the construction.

Figure 2 is an enlarged fragmentary view partly in section of the valve controlled ventilating device.

The details of construction and operation of the invention are as follows:

A window 1 having a frame 2 which is adapted to slide in a window casing 3 may seat upon the window seat 4. The lower member of the window frame 2 is recessed as at 7 to accommodate a plate 6 which is secured firmly to the window frame and has depending from it a hollow sleeve 8 having internal threads 9. The threads are preferably of a high pitch.

Adapted to operate within the sleeve 8 is a screw shaft 10 having threads of a high pitch adapted to engage the internal threads of the sleeve 8. The screw shaft 10 has keyed to its lower end a beveled gear 11, the length of the screw shaft 10 being proportioned so that the bevel gear 11 will mesh with a second bevel gear 12 hereinafter described.

A gas valve 15 is interposed in a gas line 16 which leads to any type of gas heater 17. Ordinarily the gas line will be disposed within a wall 18, the screw shaft 10 and the hollow sleeve 8 being disposed vertically within the wall 18 and the casing 4 having a hole through which the sleeve 8 may slide. However, other arrangements involving the same principles may be employed.

The valve 15 comprises any standard form of gas valve having a T 19 within which is a passageway 20 and a stem 21 is adapted to screw in and out and to close and open the passage 20. A handle 22 is secured to the outer end of the stem 21 and a nut 23 is a part of the standard valve 15.

The bevel gear 12 is securely fastened to the stem 21 as by means of a key 13 residing in a keyway formed in the bevel gear 12 and the stem 21. A collar 24 secured to the stem 21 by a pin 25 is adapted to retain the bevel gear 12 longitudinally of the shaft and a washer 26 interposed between the bevel gear 12 and the nut 23 provides a thrust bearing for the bevel gear 12. The bevel gear 12 is limitably slideable longitudinally of the stem 21 to compensate for the longitudinal movement of the stem 21. Where the valve 15 is within the wall 18 the stem 21 will extend through an opening in a base board 27 so that the handle 22 will be accessible from within the room.

The operation of the invention should now be apparent. Assuming that the window 1 were in a closed position and the valve 15 also closed, which is the normal relation between the valve and the window, the valve is opened to permit the gas heater 17 to be lighted. In order to open the valve 15 the stem 21 must be rotated by means of the handle 22 in a left hand direction. This movement will cause the bevel gear 12 keyed to the stem 21 to rotate, and meshing with the bevel gear 11 will cause the screw shaft 10 to revolve and the screw shaft engaging the threads 9 of the sleeve 8 will cause the sleeve 8 to move to a substantial distance upwardly carrying with it the window 1 into a position substantially as illustrated in Figure 1. If while the valve is open the gas flow should be momentarily discontinued and the fire extinguished the ventilation afforded by the opening of the window 1 will prevent injury to persons in the room. The open window further provides an assurance of ventilation and supply of oxygen to the gas heater when the heater is in use. When it is desired to turn off the gas flow and the valve stem 21 is turned in a right hand direction the bevel gear 12 meshing with the bevel gear 11 will cause the shaft 10 engaging with the sleeve 8 to screw in an opposite direction and to lower the window 1 into a closed position upon the window seat 4.

The bevel gear 12 is preferably larger than the bevel gear 11, the ratio between these gears and the pitch of the threads on the screw shaft 10 combining to determine the movement of the window relative to the turning of the valve stem.

The utility of the gas valve controlled ventilating device will of course be increased when used in a room having ventilators near the ceiling through which hot air or gas might escape.

Various changes may be made without departing from the spirit of the invention as claimed.

What is claimed is:

1. In combination with a window and a gas supply, a valve having a rotatable stem adapted to control the gas supply, a gear on said stem, a screw shaft and a second gear mounted on the shaft adapted to mesh with the first gear, a hollow threaded sleeve on the window adapted to engage the screw shaft, being adapted to raise the window when the valve stem is turned in one direction and to close the window when the valve stem is turned in the other direction.

2. In combination with a window having a screw-threaded element and a gas supply, a valve having a rotatable stem adapted to control the gas supply, a gear on said stem, a screw shaft and a second gear mounted on the screw shaft and adapted to mesh with said first gear, said screw shaft being operatively connected with the said screw threaded element on the window to open and close the window when the valve stem is turned in one direction or the other.

In testimony whereof I have signed my name to this specification.

HARRY DYER.